United States Patent [19]
Takashima et al.

[11] Patent Number: 5,552,509
[45] Date of Patent: Sep. 3, 1996

[54] PHENOLIC RESIN COMPOSITIONS DERIVED FROM BISPHENOL COMPOUNDS AND THEIR CONDENSATES

[75] Inventors: Tomoko Takashima; Shigeru Iimuro, both of Aichi; Takashi Kitamura, Kanagawa, all of Japan

[73] Assignee: Mitsui Toatsu Chemicals, Inc., Tokyo, Japan

[21] Appl. No.: 114,081

[22] Filed: Aug. 31, 1993

[30] Foreign Application Priority Data

Sep. 4, 1992 [JP] Japan ..................................... 4-237287

[51] Int. Cl.$^6$ ..................................... C08G 8/04
[52] U.S. Cl. .................. 528/129; 528/153; 528/155; 525/132; 525/134; 525/135; 525/137; 525/390; 525/534
[58] Field of Search ..................................... 528/129, 153, 528/155; 525/534, 390, 132, 134, 135, 137

[56] References Cited

FOREIGN PATENT DOCUMENTS

| | | | |
|---|---|---|---|
| 36-41655 | 9/1961 | Japan | ................ B22C 1/22 |
| 62-32015 | 7/1987 | Japan | ................ B22C 1/22 |
| 62-320015 | 7/1987 | Japan | ................ B22C 1/22 |
| 4-93311 | 3/1992 | Japan | ................ B22C 1/22 |

*Primary Examiner*—James J. Seidleck
*Assistant Examiner*—Richard L. Jones
*Attorney, Agent, or Firm*—Burns, Doane, Swecker & Mathis

[57] ABSTRACT

A phenolic resin composition herein disclosed comprises, as essential components, (i) at least one phenol resin A selected from the group consisting of residues formed through purification of bisphenol A, residues obtained by cleaving the bisphenol A-purification residue, condensates of the bisphenol A-purification residue obtained by reacting the bisphenol A-purification residue with formaldehyde and condensates of the cleavage residue obtained by reacting the cleavage residue with formaldehyde, and (ii) at least one phenolic resin B selected from the group consisting of high-boiling fraction obtained through production of bisphenol F and condensates of the high-boiling fraction obtained by reacting the high-boiling fraction with formaldehyde. The phenolic resin composition can be used in making resin-coated sand particles which do not give out a bad smell and do not generate any soot and smoke during forming a mold by the shell molding method and which have good disintegration properties without using any sand-baking process.

6 Claims, 3 Drawing Sheets

PHENOLIC RESIN COMPOSITIONS DERIVED FROM BISPHENOL COMPOUNDS AND THEIR CONDENSATES

BACKGROUND OF THE INVENTION (a) Field of the Invention

The present invention relates to a phenolic resin composition. More specifically, the present invention pertains to a phenolic resin composition for use in making resin-coated sand particles which do not give out a bad smell and do not generate any soot and smoke during formation of a mold by the usual shell molding method and which have good disintegration properties after casting.

(b) Description of the Prior Art

In general, phenolic resins have conventionally been used as resins for coating sand particles employed in the shell molding method. This is because the cured phenolic resins have excellent strength and rigidity at ordinary and high temperatures, and a relatively low and stable price.

Resin-coated sand particles are charged in a preheated mold and the charged sand particles are heated through heat conduction so that the resin on the surface of the sand particles becomes molten together and cured to give a mold. Most of these molds thus formed are cores, which are incorporated into principal molds produced according to other processes so that molten metal can be casted in the mold. The resin is heat-decomposed upon pouring the molten metal so that a mold can be obtained through treating processes such as cooling and knock-out processes. The term "core" herein used means a part used for forming a cavity in a casting.

The resins for coating sand particles which are used for producing a mold according to the shell molding method should satisfy the following requirements: 1) they must permit the formation of a mold having high strength; 2) they must have good disintegration properties after casting; and 3) they must not produce a bad smell and must not generate much soot and smoke during forming the sand particles into a mold and casting a mold.

There have been known various methods for preparing resins capable of providing a mold having high strength such as a method in which a resin having a low molecular weight is employed and a method which makes use of phenol resins modified with alkyl phenols. However, if a resin having a low molecular weight is used, the fusion temperature thereof is reduced and it is liable to cause blocking. Moreover, conventional phenol novolak resins having low molecular weights which are in general available in the market have high contents of phenol and/or binuclear phenolic components which result in production of a bad smell and generation of large amounts of soot and smoke. On the other hand, the method which makes use of alkylphenols suffers from a problem of low hardening rate. Improving the flow properties of resin-coated sand (RCS) particles and improving the packing density of the resin in a mold are very important for the enhancement of the strength of the resulting mold. The flow properties can be improved by reduction of the molecular weight of a resin used or by addition of a lubricant to a resin. However, the amount of such a lubricant to be added is limited to a small amount and if the amount thereof exceeds 5% by weight, the strength of the resulting mold is conversely impaired.

In the shell molding method, molten metal surrounds a core during pouring the molten metal in the mold and, therefore, the atmosphere thereof is completely free of oxygen. For this reason, the phenolic resin is carbonized and thus easily disintegrated after cooling. In this case, however, the mold often holds high strength and thus the problem of low disintegration properties arises. In particular, aluminum has recently been used for the production of cars to lighten the weight thereof and to thus reduce fuel expenses. However, the foregoing phenomenon is problematic for the core of a low temperature-casted mold and the mold as such cannot be used because of poor disintegration properties. For this reason, the disintegration properties of the core produced at a low molten metal-pouring temperature have presently been improved by subjecting the core to sand-baking at a temperature ranging from 400° to 500° C. for several hours after casting, but this results in an increase in its cost. Accordingly, there has been desired, in the field of castings, the development of a resin for a shell mold having excellent disintegration properties after casting. Many attempts have been made for the improvement of the disintegration properties of resins for shell molding. For example, a small amount of an agent for accelerating disintegration has, in fact, been used in most of such techniques.

Japanese Examined Patent Publication (hereinafter referred to as "J.P. KOKOKU") Nos. Sho 62-32015 and Sho 61-41655 disclose resin compositions having good disintegration properties which make use of the residues obtained through purification or cleavage of bisphenol A. These patents utilize a mixture of the residues obtained through purification or cleavage of bisphenol A with a phenol novolak resin which is generally available in the market, or a resin obtained through a condensation reaction of the residues obtained through purification and cleavage of bisphenol A with phenol and formaldehyde. Therefore, these resin compositions often have high contents of binuclear phenols originating from the phenol novolak resin and optionally comprise unreacted phenol.

Moreover, a gas producing a bad smell and containing soot and smoke is generated when a mold is produced through the use of resin-coated sand particles. This causes a social problem in that the gas impairs the environmental condition in and around mold-production factories. It has been believed that the production of a bad smell and the generation of soot and smoke are caused by the presence of formalin, ammonia, phenol, binuclear phenols and low molecular weight decomposition products originating from other additives. When the resins having excellent disintegration properties disclosed in the foregoing patent are used, they result in the sever production of a bad smell and generate large amounts of soot and smoke.

Japanese Un-examined Patent Publication (hereunder referred to as "J.P. KOKAI") No. Hei 4-93311 discloses that a resin hardly producing a bad smell can be obtained by reduction of the contents of mono- and bi-nuclear components of a novolak type phenol resins. However, the resulting resin has a molecular weight higher than the starting phenol novolak resin and poor flow properties since the resin is obtained by simply removing the mono- and bi-nuclear components from the starting phenol novolak resin generally available in the market. If the resin used has a high molecular weight, the resin holds its strength even after the sand-baking process and this results in the formation of a mold inferior in the disintegration properties.

As has been discussed above, there has not yet been proposed any resin for shell molding which maintains satisfactory disintegration properties and can solve the problems of producing a bad smell and generation of soot and smoke, during formation of a mold.

SUMMARY OF THE INVENTION

Accordingly, an object of the present invention is to provide a resin for shell molding which permits the solution of problems of producing of a bad smell and generation of soot and smoke during the production of a mold and which ensures good disintegration properties after casting into a mold.

The inventors of this invention have conducted intensive studies to develop a resin for shell molding having the foregoing desired properties. It has been found that the foregoing object of the present invention can effectively be accomplished by making use of the residue which is produced during the production of bisphenol A, in particular, the residue produced during the purification of bisphenol A and the residue obtained by cleaving the residue which is produced through the purification of bisphenol A, as well as the high-boiling fraction obtained during the production of bisphenol F.

According to the present invention, there is provided a phenolic resin composition comprising, as essential components, (i) at least one phenolic resin A selected from the group consisting of residues formed through purification of bisphenol A (hereunder referred to as "bisphenol A-purification residue"), residues obtained by cleaving the bisphenol A-purification residue (hereunder referred to as "bisphenol A-cleavage residue"), condensates of the bisphenol A-purification residue obtained by reacting the bisphenol A-purification residue with formaldehyde and condensates of the bisphenol A-cleavage residue obtained by reacting the bisphenol A-cleavage residue with formaldehyde, and (ii) at least one phenolic resin B selected from the group consisting of high-boiling fractions obtained during production of bisphenol F and condensates of the high-boiling fractions obtained by reacting the high-boiling fractions with formaldehyde; and a phenolic resin composition comprising, as essential components, a phenolic resin obtained by mixing at least one phenolic resin A selected from the foregoing group (i) and at least one phenolic resin B selected from the foregoing group (ii) and then reacting the mixture with formaldehyde through condensation.

DESCRIPTION OF THE PREFERRED EMBODIMENTS

Figure 1:
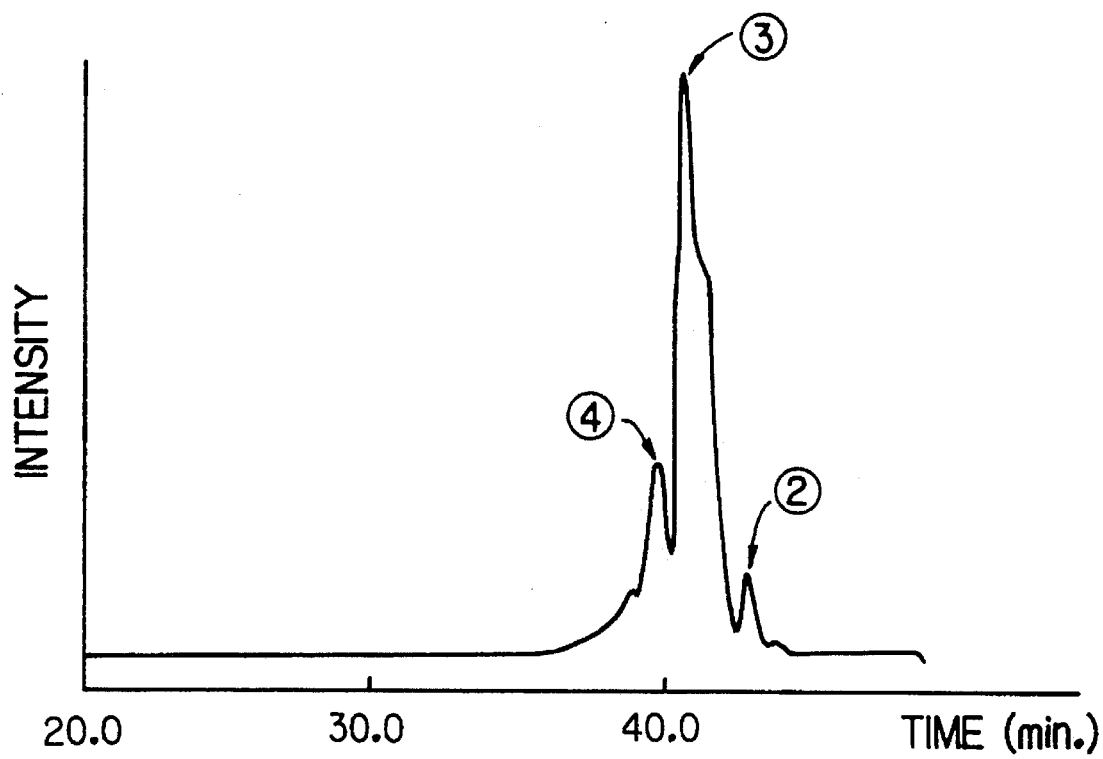
FIG. 1 is a chart obtained by analyzing, by the GPC technique, the high-boiling fraction formed during production of bisphenol F, i.e., the product of Resin-Preparation Example 1.

The term "bisphenol A-purification residue" herein used means a residue comprising, as principal components, bisphenol A and isomers thereof, a Chroman compound called Chroman I, and other polyphenol compounds and high molecular weight substances.

The bisphenol A-purification residue is prepared according to the following method. Bisphenol A is first prepared by reacting phenol and acetone in the presence of a catalyst according to a known method, followed by removal of, for instance, the catalyst used, the water formed through the reaction, the unreacted phenol and the substantial part of the resulting bisphenol A from the reaction solution.

The purification of bisphenol A is performed for the purpose of removing by-products formed during post-treatments such as the removal of by-products formed through the condensation reaction of phenol and acetone in the presence of an acidic catalyst and the catalyst as well as the removal of the unreacted phenol. The purification can be carried out by, for instance, distillation; recrystallization from a solvent such as benzene, toluene or xylene; precipitation of the adduct of bisphenol A with phenol. The bisphenol A-purification residue herein means the bottom liquid obtained through distillation; filtrates obtained upon purification through the recrystallization from a solvent, from which the solvent is recovered; or filtrates obtained upon purification through the precipitation of the adduct, from which the phenol is recovered.

The term "bisphenol A-cleavage residue" obtained by cleaving the bisphenol A-purification residue used in the present invention means the high-boiling fraction formed by treating the bisphenol A-purification residue at a temperature of not less than 150° C., preferably 180° to 250° C. and a pressure ranging from ordinary pressure to a reduced pressure, preferably a reduced pressure of the order of 100 mm Hg in the presence of a basic or acidic catalyst. For instance, dihydroxydiphenylpropane present in the bisphenol A-purification residue is decomposed into phenol and isopropenyl phenol through a cleavage-reaction under these conditions and the cleavage products are distilled out of the system while retaining, in the system, a black tar-like high molecular weight phenolic cleavage residue. In this respect, the cleavage-reaction takes place through simple heating. The high molecular weight phenolic cleavage residue thus obtained is a black tar-like mixture of high molecular weight compounds having phenolic hydroxyl groups. The mixture has a softening point as determined by the ring and ball method ranging from 90° to 110° C. and an average molecular weight as determined by the GPC technique ranging from 400 to 600. Moreover, the presence of phenolic hydroxyl groups therein is confirmed by the IR spectrometry and the OH value thereof in general ranges from 200 to 300 mg KOH/g. The molecular weight of the mixture is substantially higher than that of the bisphenol A-purification residue (whose softening point as determined by the ring and ball method ranges from 30° to 80° C. and whose average molecular weight as determined by the GPC technique ranges from 200 to 400).

The condensate of the bisphenol A-purification residue used in the present invention is prepared by subjecting the bisphenol A-purification residue to a condensation reaction with formaldehyde in the presence of an acidic catalyst. In this case, phenols may be added to the bisphenol A-purification residue together with formaldehyde to increase the amount of phenolic components per unit weight of the resulting condensate. In this respect, however, if the contents of unreacted phenols and phenols each having two condensed phenolic nuclei are high, the degree of crosslinking of the resulting product is lowered, the strength thereof is insufficient and there is severe production of a bad smell during formation of a mold. The mixing ratio of phenols to the bisphenol A-purification residue varies depending on the conditions for the preparation of coated sand particles and the kinds of castings to be formed, but the amount of phenols desirably ranges from about 0 to 10 parts by weight per 100 parts by weight of the bisphenol A-purification residue. This amount of phenols to be used corresponds to that of phenols which are approximately completely reacted. Examples of phenols usable in the invention are phenol, cresol, xylenol, resorcin or a mixture thereof, with phenol being particularly preferred.

The condensate of the bisphenol A-cleavage residue usable in the invention is prepared by subjecting the bisphenol A-cleavage residue to a condensation reaction with formaldehyde in the presence of an acidic catalyst. In this condensation reaction, phenols may be added to the bisphenol A-cleavage residue together with formaldehyde to increase the content of phenolic components per unit weight of the resulting condensate. In this respect, however, if the contents of unreacted phenols and phenols each having two condensed phenolic nuclei are high, the degree of crosslinking of the resulting product is lowered, the strength thereof is insufficient and there is severe production of a bad smell during formation of a mold. The mixing ratio of phenols to the bisphenol A-cleavage residue varies depending on the conditions for the preparation of coated sand particles and the kinds of castings to be formed, but the amount of phenols desirably ranges from about 0 to 10 parts by weight per 100 parts by weight of the bisphenol A-cleavage residue. This amount of phenols to be used corresponds to that of phenols which are approximately completely reacted. Examples of phenols usable in the invention are phenol, cresol, xylenol, resorcin or a mixture thereof, with phenol being particularly preferred.

For instance, formalin, paraformaldehyde or hexamethylenetetramine may be adopted as a source of formaldehyde used in these condensation reactions.

Preferred catalysts include, for instance, acidic catalysts such as hydrochloric acid, sulfuric acid and oxalic acid and the amount thereof preferably ranges from 0.01 to 2 parts by weight per 100 parts by weight of the mixture of phenolic components (i.e., the aforementioned bisphenol A-purification residue or the bisphenol A-cleavage residue) with phenols, as in the usual preparation of phenol resins.

Other conditions for the condensation reaction can be determined according to the usual conditions for the preparation of phenol resins. More specifically, the amount of formaldehyde ranges from 0.01 to 1 mole per unit amount of the phenolic components (expressed in terms of the reduced molar amount), the reaction temperature in general ranges from 50° to 100° C. and the reaction time ranges from 1 to 15 hours, in general 2 to 6 hours.

After the condensation reaction, the catalyst is, if desired, neutralized, followed by dehydration and removal of the unreacted phenols when the content thereof is high to thus give a condensate of the bisphenol A-purification residue or a condensate of the bisphenol A-cleavage residue.

The phenolic resin composition of the invention also comprises, as an essential component, the high-boiling fraction obtained through the production of bisphenol F which is a product discharged from the process which comprises synthesizing bisphenol F starting from phenol and formaldehyde and then distilling the reaction mixture.

The preparation of bisphenol F will be explained in more detail below.

Phenol, formaldehyde and an acidic catalyst are introduced into a reactor and reacted at a predetermined temperature over a desired period of time with stirring. Then the acidic catalyst, the water formed through the reaction and the unreacted phenol are removed to give crude bisphenol F.

The phenol used in the invention may be cresol or o-, p- or m-substituted alkyl phenols in addition to phenol.

In the present invention, formalin, paraformaldehyde, hexamethylenetetramine, trioxan and cyclic formal may be used as the formaldehyde component.

The reaction molar ratio (the molar ratio of phenol to formaldehyde: P/F) is in general not less than 6, preferably 6 to 40 and more preferably 10 to 35. The higher the molar ratio: P/F, the higher the content of trinuclear moieties in the crude bisphenol F from which binuclear moieties are removed.

The acidic catalyst may be a solid acidic catalyst such as a cation-exchange resin; hydrochloric acid, sulfuric acid, salicylic acid, p-toluenesulfonic acid or oxalic acid.

The reaction temperature and time vary depending on various factors such as the kinds and amounts of the catalysts used and the reaction molar ratio: P/F, but in general range from 50° to 110° C. and 0.5 to 10 hours, respectively.

If a solid acidic catalyst such as a cation-exchange resin is used, it is not neccesary to remove the catalyst after completion of the reaction and, for instance, the unreacted formaldehyde and the water formed through the reaction are removed by a method such as distillation under reduced pressure. While if hydrochloric acid or oxalic acid is, for instance, used as a catalyst, the acidic catalyst can be removed simultaneously with the unreacted formaldehyde, the water added to the reaction system and the water formed during the reaction through, for instance, distillation under reduced pressure carried out after the completion of the reaction.

Then the unreacted phenol is removed by a known means such as distillation under reduced pressure. These separation and/or removal processes may be separately carried out or the unreacted phenol may first be separated through the use of a partial condenser and then other components such as water may be removed through the use of a total condenser. The recovered phenol can be recycled to the reaction system as a starting material.

Then the crude bisphenol F is transferred to a distillation process. An evaporator used in this distillation process is preferably provided with a partial condenser which permits the recycle, to the evaporator, of a condensed liquid obtained by condensing a part of gases generated in the evaporator. Examples of such evaporators preferably used in the invention are falling film type evaporators and centrifugal-film type evaporators.

If a plurality of evaporators are used, each evaporator may or may not be equipped with a partial condenser, but at least the evaporator used in the final distillation stage is preferably equipped with a partial condenser. In this case, preferably used are those discussed above.

The distillation temperature ranges from 200° to 250° C. This is because if the distillation temperature exceeds 250° C., the distillation sometimes accompanies decomposition and coloring of the resulting bisphenol F, while if it is less than 200° C., the distillation must be carried out at a low pressure of the order of less than 1 mm Hg.

The high-boiling fraction can thus be prepared through the distillation process described above and is usable in the present invention as an essential component, i.e., the high-boiling fraction obtained through the preparation of bisphenol F.

The high-boiling fraction obtained through the preparation of bisphenol F mainly comprises phenol resins, each of which comprises at least three condensed phenol nuclei, and optionally comprise small amounts of other phenols and bisphenol F. Specific examples thereof include VR-1300 (trade name of a product available from Mitsui Toatsu Chemicals, Inc.).

The condensate of the high-boiling fraction obtained through the preparation of bisphenol F is prepared by subjecting, to a condensation reaction, the high-boiling fraction obtained through the preparation of bisphenol F and formaldehyde. The high-boiling fraction obtained through the preparation of bisphenol F mainly comprises trinuclear phenol resins, the content thereof ranges from about 60 to 95% by weight and other components thereof are small amounts of binuclear, tetranuclear and pentanuclear moieties. For this reason, the resulting condensate of the high-boiling fraction obtained through the preparation of bisphenol F likewise has a condensed nuclear number distribution different from that of the conventional phenol novolak resin which is a condensate of phenol and formaldehyde.

Incidentally, the high-boiling fraction having a trinuclear phenol resin content of the order of 60 to 95% by weight may be one prepared by a method other than the distillation method.

The conventional phenol novolak resins are called straight novolaks and usually prepared by reacting phenol with formaldehyde in a molar ratio (P/F) ranging from 1 to 4. The phenol novolak resin is a resin having an average number of condensed nuclei ranging from 4 to 6 and a binuclear moiety content ranging from 10 to 30% by weight. It has been known that the distribution of condensed nuclear number of the phenol novolak resin is determined by the molar ratio of phenol to formaldehyde (P/F). For instance, the reaction of phenol and formaldehyde carried out at a molar ratio: P/F of 2 allows the formation of a phenol novolak resin having a binuclear moiety content of about 25% by weight, a trinuclear moiety content of 20% by weight and a tetranuclear moiety content of about 15% by weight. The higher the molar ratio: P/F, the smaller the average number of condensed nuclei of the resulting phenol novolak resin. Accordingly, the content of binuclear moieties is increased and thus the softening point and viscosity of the resulting phenol novolak resin are reduced.

On the other hand, the condensate of the high-boiling fraction obtained through the preparation of bisphenol F never has a binuclear moiety content greater than that of the starting material, since formaldehyde is reacted with the high-boiling fraction obtained through the preparation of bisphenol F having a high trinuclear moiety content to give a high molecular weight product.

The procedures for preparing a condensate of the high-boiling fraction obtained through the preparation of bisphenol F will be detailed below using the high-boiling fraction having a trinuclear moiety content of 71.8% by weight, a binuclear moiety content of 10.8% by weight, a tetranuclear moiety content of 14.0% by weight and a content of pentanuclear or higher moieties of 3.4% by weight, by way of example.

A 37% formalin aqueous solution is added to the high-boiling fraction in an amount of 5 parts by weight per 100 parts by weight of the fraction and the reaction thereof is run to give a condensate of the high-boiling fraction having a trinuclear moiety content of the order of 43% by weight, a binuclear moiety content of the order of 9% by weight, a tetranuclear moiety content of the order of 12% by weight, a pentanuclear moiety content of the order of 5% by weight, a hexanuclear moiety content of the order of 18% by weight and a content of heptanuclear or higher moieties of the order of 13% by weight.

Moreover, the use of 8 parts by weight of a 37% formalin aqueous solution per 100 parts by weight of the high-boiling fraction can provide a condensate of the high-boiling fraction having a trinuclear moiety content of the order of 32% by weight, a binuclear moiety content of the order of 7% by weight, a tetranuclear moiety content of the order of 10% by weight, a pentanuclear moiety content of the order of 6% by weight, a hexanuclear moiety content of the order of 12% by weight and a content of heptanuclear or higher moieties of the order of 33% by weight.

In addition, the use of 10 parts by weight of a 37% formalin aqueous solution per 100 parts by weight of the high-boiling fraction can provide a condensate of the high-boiling fraction having a trinuclear moiety content of the order of 26% by weight, a binuclear moiety content of the order of 4% by weight, a tetranuclear moiety content of the order of 8% by weight, a pentanuclear moiety content of the order of 5% by weight, a hexanuclear moiety content of the order of 12% by weight and a content of heptanuclear or higher moieties of the order of 44% by weight.

Furthermore, the use of 15 parts by weight of a 37% formalin aqueous solution per 100 parts by weight of the high-boiling fraction can provide a condensate of the high-boiling fraction having a trinuclear moiety content of the order of 15% by weight, a binuclear moiety content of the order of 3% by weight, a tetranuclear moiety content of the order of 5% by weight, a pentanuclear moiety content of the order of 4% by weight, a hexanuclear moiety content of the order of 7% by weight and a content of heptanuclear or higher moieties of the order of 66% by weight.

It is clear from the foregoing that the condensate of the high-boiling fraction obtained through the preparation of bisphenol F not only has a low binuclear moiety content and a high trinuclear moiety content, but also has a condensed nuclear number distribution on the high molecular weight side different from that observed for the conventional phenol novolak resin.

Figure 4:
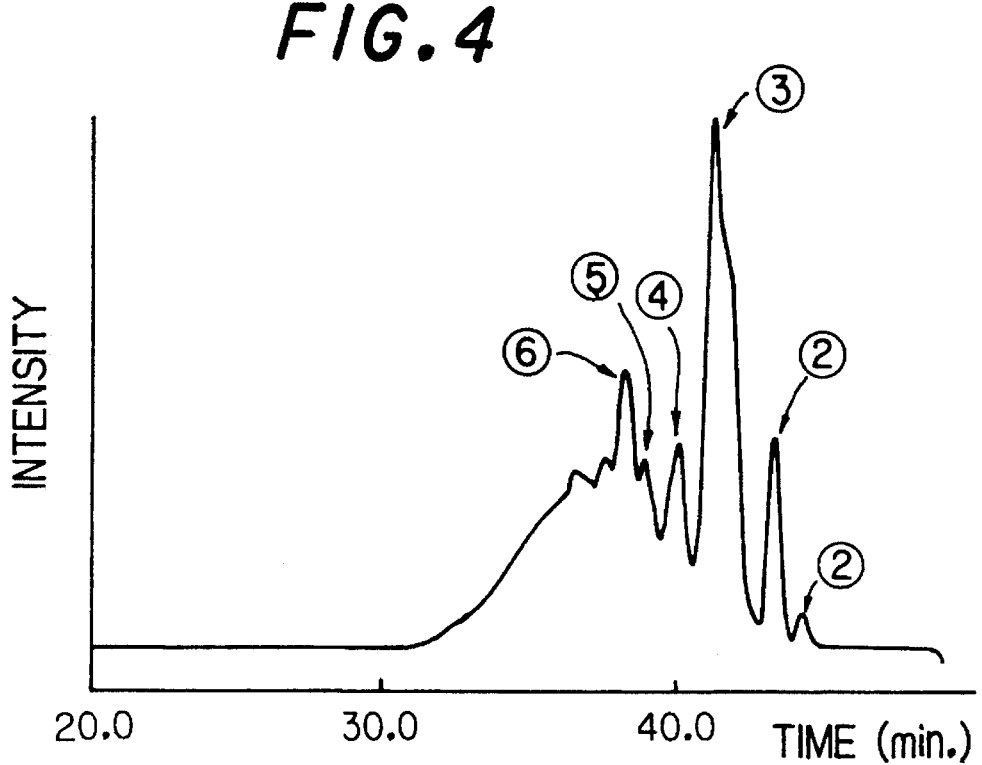
FIG. 4 is a chart obtained by analyzing, by the GPC technique, the condensate of the high-boiling fraction formed during production of bisphenol F, i.e., the product of Resin-Preparation Example 3.
Figure 5:
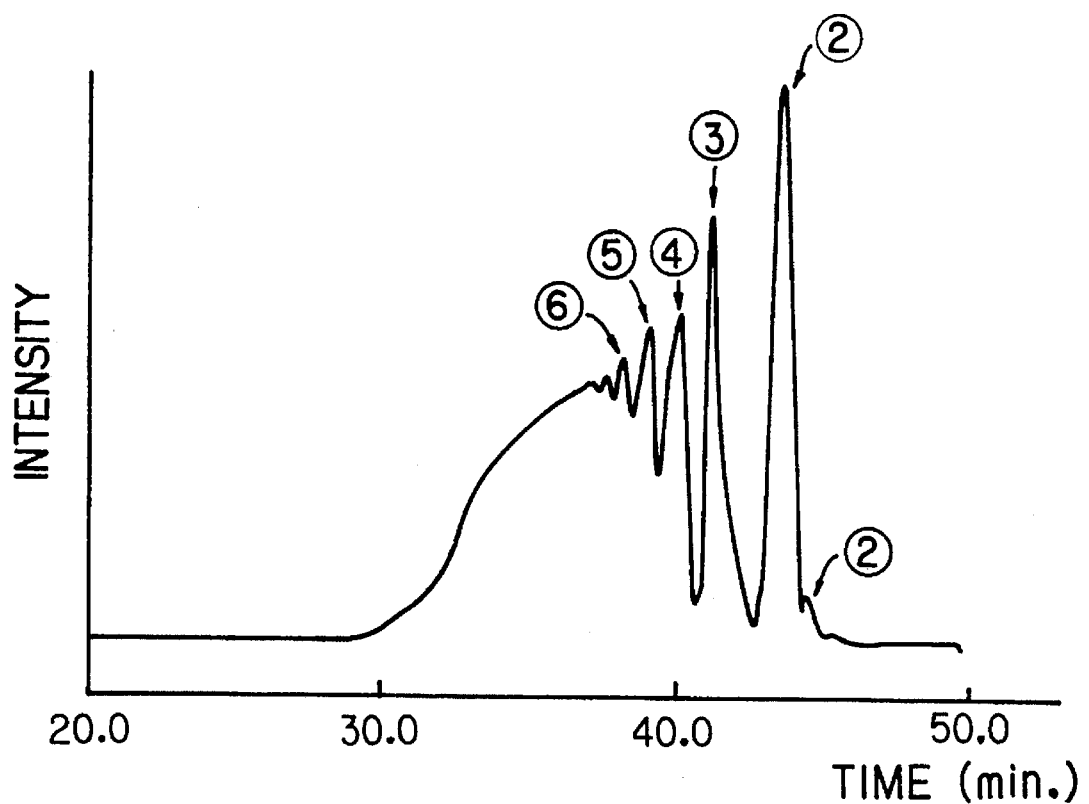
FIG. 5 is a chart obtained by analyzing, by the GPC technique, a phenol novolak resin commonly used in this art and prepared in Resin-Preparation Example 6.

When investigating these condensed nuclear number distributions while comparing the charts thereof as determined by the gel permeation chromatography (GPC) technique, the binuclear moiety content is highest and the moiety contents are decreased as the condensed nuclear number increases for the conventional phenol novolak resin (see FIG. 5). More specifically, the contents are decreased in the order: trinuclear, tetranuclear, pentanuclear and hexanuclear moieties. On the other hand, the trinuclear moiety content is highest and the moiety contents are gradually decreased as the condensed nuclear number increases for the conventional phenol novolak resin from which mononuclear and binuclear moieties are removed (see FIG. 6). In other words, the contents are decreased in the order: tetranuclear, pentanuclear and hexanuclear moieties. On the contrary, the condensate of the high-boiling fraction obtained through the preparation of bisphenol F does not have evenly decreasing contents of peaks, but has an uneven peak pattern (see FIGS. 2 to 4). In other words, the contents do not decrease in the order: trinuclear, tetranuclear, pentanuclear and hexanuclear moieties.

Examples of formaldehyde sources used in the condensation reaction include formalin, paraformaldehyde and hexamethylenetetramine.

Examples of acidic catalysts used in the condensation reaction are hydrochloric acid, sulfuric acid and oxalic acid and the amount thereof preferably ranges from 0.01 to 2 parts by weight per 100 parts by weight of the high-boiling fraction as in the preparation of the usual phenol resins.

Other conditions for the condensation reaction vary depending on the molecular weight of the high-boiling fraction obtained through the preparation of bisphenol F, but the amount of a 37% formalin aqueous solution used for preparing a resin having an average molecular weight of the order of 600 ranges from 11 to 12 parts by weight per 100 parts by weight of the high-boiling fraction. The reaction temperature and time range from 50° to 120° C. and 1 to 15 hours, generally 2 to 6 hours, respectively.

After the condensation reaction, the catalyst is, if desired, neutralized and the reaction solution is then dehydrated to give an intended condensate of the high-boiling fraction obtained through the preparation of bisphenol F.

According to another aspect of the present invention, the phenolic resin composition can also be obtained by mixing at least one phenolic resin A selected from the group consisting of bisphenol A-purification residue, bisphenol A-cleavage residue, condensates of the bisphenol A-purification residue and condensates of the bisphenol A-cleavage residue, and at least one phenolic resin B selected from the group consisting of high-boiling fraction obtained through the preparation of bisphenol F and condensates of the high-boiling fraction obtained through the preparation of bisphenol F, and then reacting the mixture with formaldehyde through condensation. Alternatively, it is also possible to admix a phenolic resin, which is obtained by mixing at least one phenolic resin A with at least one phenolic resin B and then reacting the mixture with formaldehyde through condensation, with a phenolic resin B. In this case, the mixing ratio and the amount of formaldehyde to be added vary depending on various factors such as the kinds of components to be mixed, conditions for the preparation of coated sand particles and kinds of castings to be formed, but the sum of the amounts of phenolic resins selected from the phenolic resins A preferably ranges from 10 to 70% by weight on the basis of the total weight of the final phenolic resin.

The phenolic resin composition of the present invention prepared in the aforementioned method may further comprise a curing accelerator such as salicylic acid and benzoic acid according to need.

A mold formed from the sand particles coated with the foregoing phenolic resin composition of the invention preferably has a cold shell-flexural strength of at least 50 kgf/cm², as determined on a test piece prepared according to JIS K-6910, on the basis of the conventional experiences.

The rate of disintegration of the resulting mold can be determined according to the following disintegration test. Coated sand particles (50 g) are introduced into a cylindrical mold having a diameter of 28 mm and a height of 70 mm and preheated to 450° C., followed by hardening the coated sand particles at 450° C. for 3 minutes and removal of the resulting test piece from the mold. Then, according to JIS K-2425 which relates to a method of quantitatively analyzing immobilized carbon as the method for testing creosote oil, processed tar—tar pitch—road tar, the test piece is then embedded in a layer of calcined particulate coke to isolate the piece from air and fired at 600° C. for 30 minutes. After cooling down to room temperature, the test piece is removed from the coke layer, vibrated for 30 seconds in a vibrational shaker, followed by weighing the test piece remaining on the sieve of the shaker, as the portion of the test piece which is not disintegrated, and the rate of disintegration is determined according to the following equation. The rate of disintegration as determined according to this test method for cores for use in forming aluminum castings is preferably not less than 30%. The more complicated the shape of the core for aluminum castings, the higher the required rate of disintegration.

Rate of Disintegration $(\%) = [(W_{orig} - W_{int})/W_{orig}] \times 100$ $W_{orig}$: the weight of the test piece prior to the treatment;
$W_{int}$: the weight of the portion of the test piece remaining in the integrated state.

The smoke density is preferably not more than 0.5 mg/m³. The smoke density is determined by positioning 10 g of coated sand particles on a plate heated to 250° C. and determining the amount of the smoke generated by a smoke density-determining device.

The intensity of a bad smell produced is preferably not more than 400 times as determined by collecting gases generated according to the method identical to that used in the determination of the smoke density and examining the collected gases by a sensory test in accordance with the three-point comparative scent bag method.

As has been discussed above in detail, the present invention provides a phenolic resin composition for use in making resin-coated sand particles which do not produced a bad smell and do not generate any soot and smoke during forming a mold by the shell molding method and which have good disintegration properties, the resin composition comprising a combination of, as essential components, (i) at least one phenol resin A selected from the group consisting of bisphenol A-purification residue, bisphenol A-cleavage residue, condensates of the bisphenol A-purification residue obtained by reacting the bisphenol A-purification residue with formaldehyde and condensates of the bisphenol A-cleavage residue obtained by reacting the bisphenol A-cleavage residue with formaldehyde, and (ii) at least one phenolic resin B selected from the group consisting of the high-boiling fractions obtained during production of bisphenol F and condensates of the high-boiling fractions obtained by reacting the high-boiling fractions with formaldehyde.

The phenolic resin composition of the present invention will become more apparent from the following working Examples, but the present invention is by no means limited to these specific Examples.

In the following Examples, the rate of disintegration, the cold shell flexural strength, the smoke density and the intensity of a bad smell were determined according to the following methods.

I. Test for Disintegration Properties and Cold Shell Flexural Strength (kgf/cm²)

Coated sand particles (50 g) were introduced into a cylindrical mold having a diameter of 28 mm and a height of 70 mm and preheated to 450° C., followed by hardening the coated sand particles by heating to 450° C. for 3 minutes and removal of the resulting test piece from the mold. Then, according to JIS K-2425 which relates to a method of quantitatively analyzing immobilized carbon as the method for testing creosote oil, processed tar—tar pitch—road tar, the test piece was then embedded in a layer of calcined particulate coke to isolate the piece from air and fired at 600° C. for 30 minutes. After cooling down to room temperature, the test piece was removed from the coke layer, vibrated for 30 seconds in a vibrational shaker, followed by weighing the test piece remaining on the sieve of the shaker, as the portion of the test piece which was not disintegrated.

The rate of disintegration was determined according to the following equation:

Rate of Disintegration (%)=[$(W_{orig}-W_{int})/W_{orig}$]×100

$W_{orig}$: the weight of the test piece prior to the treatment;
$W_{int}$: the weight of the portion of the test piece remaining in the integrated state.

On the other hand, the cold shell flexural strength was determined for a test piece prepared by calcining coated sand particles at 250° C. to form the particles into a test piece having a size of 10×10×60 mm according to JIS K-6910. In the following description, the comparison between values of the cold shell strength determined was carried out using the highest measured value for each test piece.

II. Smoke Density (mg/m$^3$)

The smoke density was determined by positioning 10 g of coated sand particles on a plate heated to 250° C. and determining the amount of the smoke thus generated by a smoke density-determining device (available from Shibata Kagaku Kiki Kogyo K.K.) and the maxima thereof were compared with one another.

The intensity of a bad smell produced during forming a mold was determined by collecting gases generated according to the method identical to that used in the determination of the smoke density and examining the collected gases by a sensory test (each test comprising 6 panelists) in accordance with the three-point comparative scent bag method.

1. Preparation of Resins

Resin Preparation Example 1

First of all, bisphenol F was prepared in the following manner.

To a 3 l volume reactor of stainless steel equipped with, for instance, a stirring machine, a temperature-controlling device, a reflux condenser, an overall condenser and a pressure-reducing device, there were added 2000 g of phenol, 172.5 g of a 37% aqueous formalin solution (P/F =10) and 5.6 g of oxalic acid dihydrate. The mixture was heated to 70° C. with stirring and the mixture was reacted under atmospheric pressure for 4 hours while operating the reflux condenser.

The reaction product was heated to 160° C. under atmospheric pressure to remove water and a small amount of phenol. Thereafter the unreacted phenol was removed by first heating the reaction system to 170° C. at a pressure of 20 mm Hg and then heating the system to 210° C. at a pressure of 6 mm Hg to give crude bisphenol F.

Thus, 350 g of crude bisphenol F was obtained and the binuclear moiety content of the crude bisphenol F was found to be 78.0% by weight.

Then the crude bisphenol F was distilled using a distillation apparatus packed with McMahon packing having a diameter of 15 mm and a height of 20 mm as a demister. The distillation was continued at a pressure of 3 mm Hg till the temperature of the crude bisphenol F reached the final temperature of 250° C. to thus give 269 g of highly pure bisphenol F as a distillate and 89 g of a high-boiling fraction having a low binuclear moiety content as a bottom product.

Figure 2:
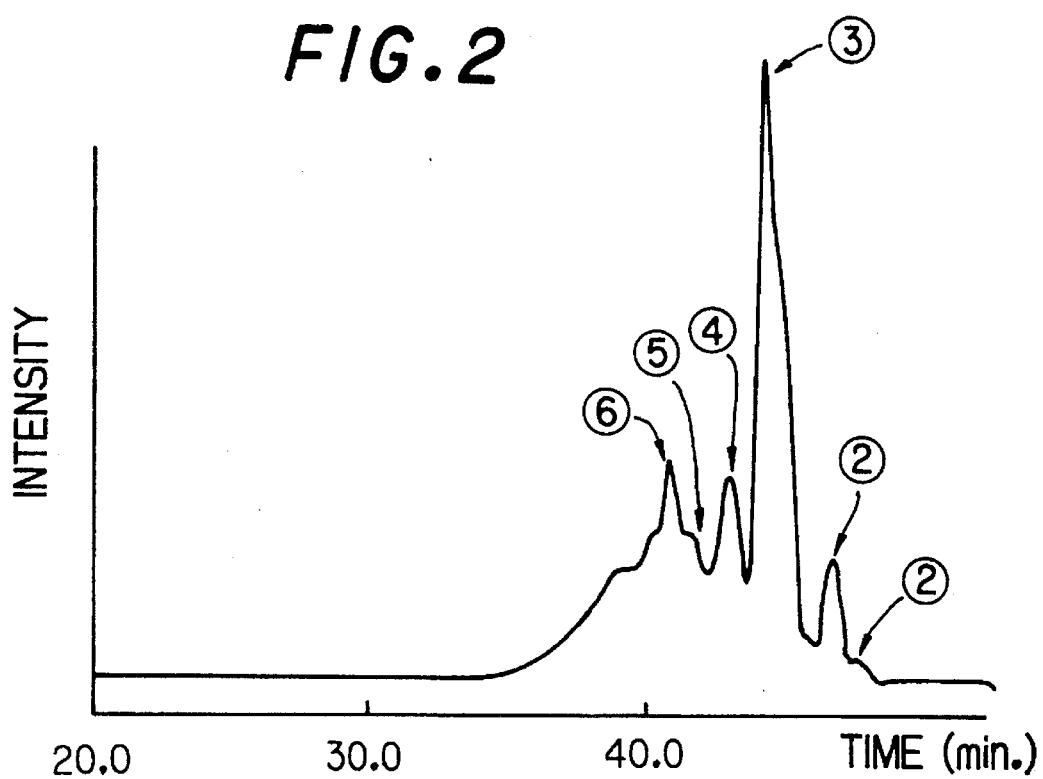
FIG. 2 is a chart obtained by analyzing, by the GPC technique, the condensate of the high-boiling fraction formed during production of bisphenol F, i.e., the product of Resin-Preparation Example 1.

To a reactor equipped with a stirring machine, a condenser and a thermometer, there was introduced 800 parts by weight of the high-boiling fraction obtained through the preparation of bisphenol F (having a binuclear moiety content of 4.9% by weight, a trinuclear moiety content of 69.1% by weight, a tetranuclear moiety content of 18.6% by weight and a content of other components of 7.4% by weight) and then 40.0 parts by weight of a 37% formalin aqueous solution and 2.2 parts by weight of oxalic acid were added to the reactor to carry out the reaction of these ingredients at 100° C. for 2 hours. After completion of the reaction, the reaction system was dehydrated to give a condensate of the high-boiling fraction. The condensate was analyzed by the gel permeation chromatography (GPC) technique. The resulting chart is shown in FIG. 2. Moreover, the high-boiling fraction obtained through the preparation of bisphenol F used as the starting material for the condensate was likewise analyzed by the GPC technique. The resulting chart is shown in FIG. 1.

Resin-Preparation Example 2

Figure 3:
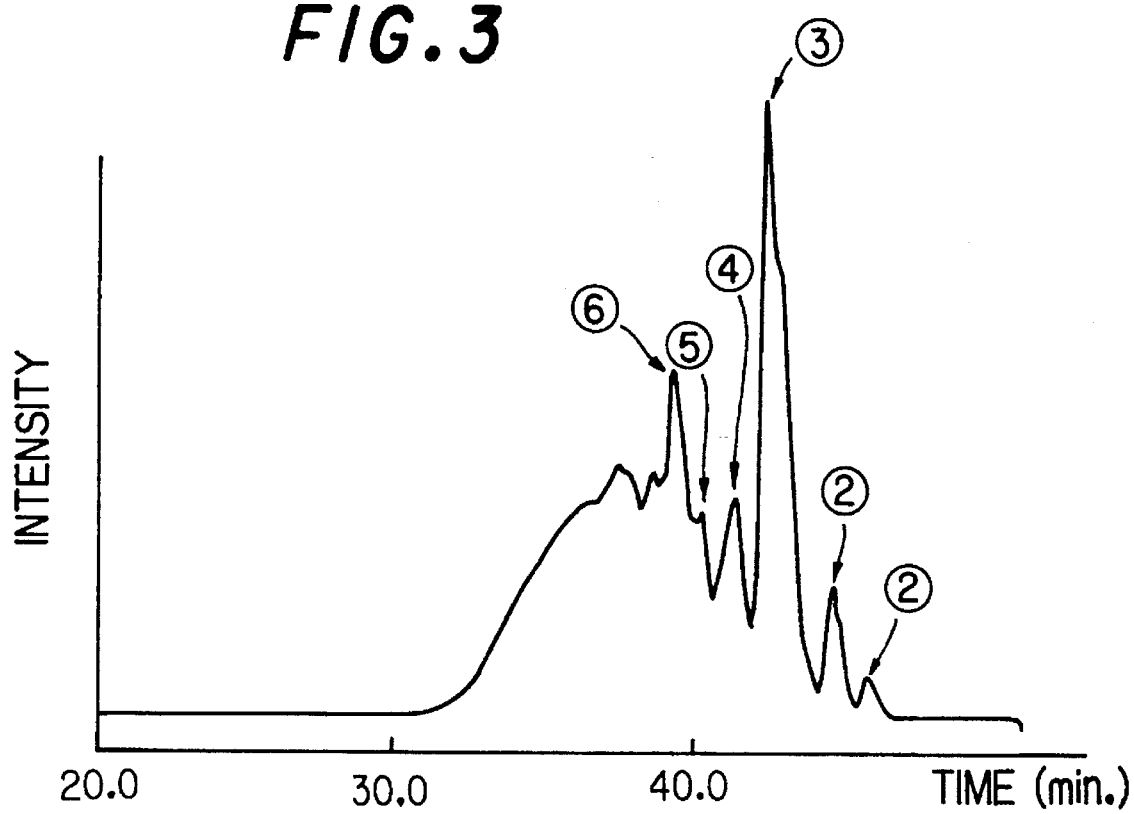
FIG. 3 is a chart obtained by analyzing, by the GPC technique, the condensate of the high-boiling fraction formed during production of bisphenol F, i.e., the product of Resin-Preparation Example 2.

To a reactor identical to that used in Resin-Preparation Example 1, there was added 800 parts by weight of a high-boiling fraction obtained through the preparation of bisphenol F (having a binuclear moiety content of 4.9% by weight, a trinuclear moiety content of 69.1% by weight, a tetranuclear moiety content of 18.6% by weight and a content of other components of 7.4% by weight) and then 80.0 parts by weight of a 37% formalin aqueous solution and 2.2 parts by weight of oxalic acid were added to the reactor to carry out the reaction of these ingredients at 100° C. for 2 hours. After completion of the reaction, the reaction system was dehydrated to give a condensate of the high-boiling fraction. The condensate was analyzed by the GPC technique. The result thus obtained is shown in FIG. 3 as a GPC chart.

Resin-Preparation Example 3

To a reactor identical to that used in Resin-Preparation Example 1, there was added 800 parts by weight of a high-boiling fraction obtained through the preparation of bisphenol F (having a binuclear moiety content of 4.9% by weight, a trinuclear moiety content of 69.1% by weight, a tetranuclear moiety content of 18.6% by weight and a content of other components of 7.4% by weight) and then 64.0 parts by weight of a 37% formalin aqueous solution and 2.2 parts by weight of oxalic acid were added to the reactor to carry out the reaction of these ingredients at 100° C. for 2 hours. After completion of the reaction, the reaction system was dehydrated to give a condensate of the high-boiling fraction. The condensate was analyzed by the GPC technique. The result thus obtained is shown in FIG. 4 as a GPC chart.

Resin-Preparation Example 4

First of all, bisphenol A-purification residue was prepared in the following manner.

To a 5 l volume reactor equipped with a stirring machine, there were added 1508 g of phenol, 182 g of acetone and 62 g of hydrochloric acid and the mixture was heated to carry out the reaction over 8 hours at a temperature of from 45° to 65° C. The reaction was carried out under a pressure of 100 mm H$_2$O.

After completion of the reaction, the resulting reaction product was heated at a pressure ranging from 70 to 75 mm Hg till the temperature thereof was elevated to a level of from 120° to 130° C. to thus remove the hydrochloric acid present therein.

Then the resulting mass was heated up to 185° C. at a pressure of 40 mm Hg to remove phenol.

Thereafter, the reaction system was further heated up to a temperature ranging from 195 to 260 while controlling the pressure to a level of 7 mm Hg to 3 mm Hg to thus remove bisphenol A and isomers thereof and to thus give 27 g of a bisphenol A-purification residue.

To a reactor identical to that used in Resin-Preparation Example 1, there was added 500 parts by weight of the bisphenol A-purification residue (comprising 32.6% by weight of bisphenol A, 0.6% by weight of o,p'-dihydroxydiphenylpropane, 2.3% by weight of Chroman I, 8.5% by weight of a derivative of Chroman I, 3.5% by weight of trisphenol and 56.7% by weight of other by-products) and then 30.0 parts by weight of a 37% formalin aqueous solution and 1.4 part by weight of oxalic acid were added to the reactor to carry out the reaction of these ingredients at 100° C. for 2 hours. After completion of the reaction, the reaction system was dehydrated to give a condensate of a bisphenol A-purification residue.

Resin-Preparation Example 5

To a reactor identical to that used in Resin-Preparation Example 1, there was added 1000 parts by weight of the bisphenol A-purification residue (comprising 32.6% by weight of bisphenol A, 0.6% by weight of o,p'-dihydroxydiphenylpropane, 2.3% by weight of Chroman I, 8.5% by weight of a derivative of Chroman I, 3.5% by weight of trisphenol and 56.7% by weight of other by-products), then the residue was cleaved at 200° C. and 50 mm Hg using a 45% by weight caustic soda aqueous solution as a catalyst and the resulting phenol and p-isopropenyl phenol were removed to give a bisphenol A-cleavage residue.

To a reactor, there was added 500 parts by weight of the resulting residue (having an OH value of 247 mg KOH/g, an average molecular weight of 460 as determined by the GPC technique, and a softening point of 98° C. as determined by the ring and ball method) and then 30.0 parts by weight of a 37% formalin aqueous solution and 1.4 part by weight of oxalic acid were added to the reactor to carry out the reaction of these ingredients at 100° C. for 2 hours. After completion of the reaction, the reaction system was dehydrated to give a condensate of the bisphenol A-cleavage residue.

Resin-Preparation Example 6

In this Preparation Example, a phenol novolak resin conventionally used was prepared. To a reactor identical to that used in Resin-Preparation Example 1, there was added 500 parts by weight of phenol and then 246 parts by weight of a 37% formalin aqueous solution and 2.5 parts by weight of oxalic acid were added to the reactor to carry out the reaction of these ingredients at 100° C. for 2 hours. After completion of the reaction, the reaction system was dehydrated and the unreacted phenol was removed from the reaction system to give a phenol novolak resin. The resulting resin was analyzed by the GPC technique and the result thus obtained was shown in FIG. 5 as a GPC chart.

Resin-Preparation Example 7

The same procedures used in Resin-Preparation Example 6 were repeated to give a phenol novolak resin. The reaction system as such containing the resulting resin was heated while reducing the pressure to 3 mm Hg till the temperature of the system was elevated up to a final level of 280° C. to distill off the mono- and bi-nuclear moieties present therein and to thus give a phenol novolak resin having a low binuclear moiety content.

Figure 6:
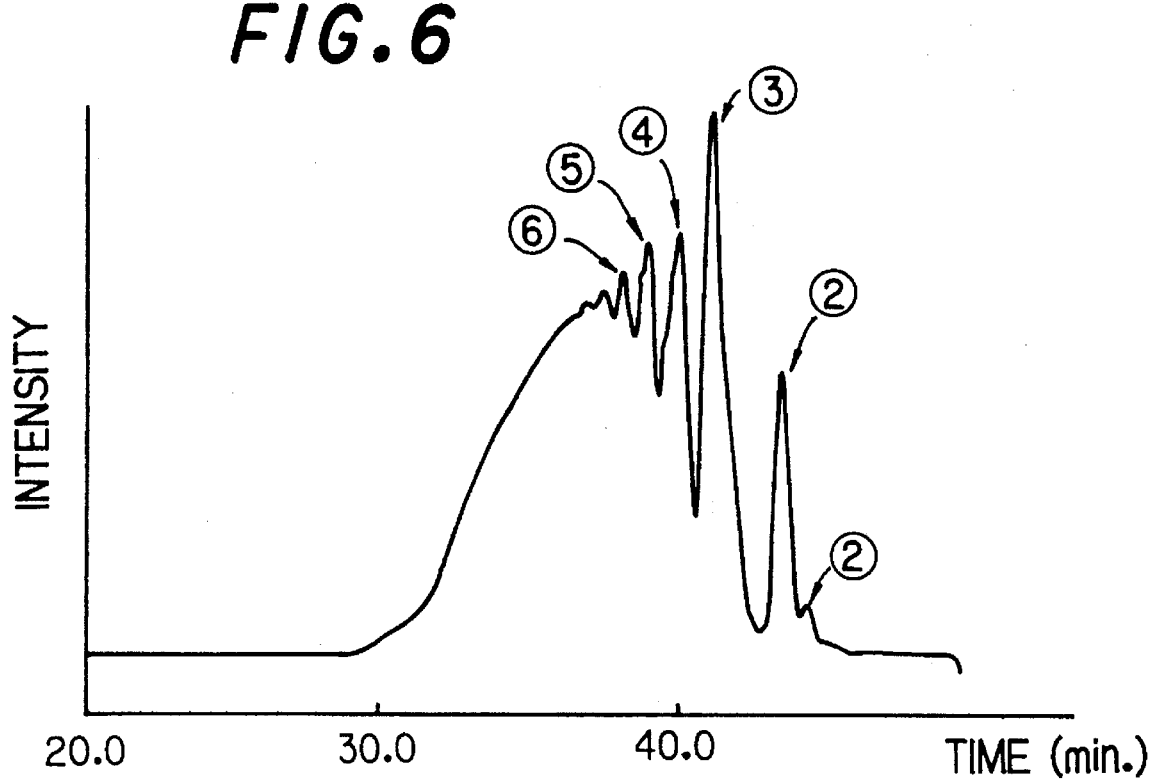
FIG. 6 is a chart obtained by analyzing, by the GPC technique, a phenol novolak resin commonly used in this art whose binuclear moiety content is reduced and prepared in Resin-Preparation Example 7.

The resulting resin was analyzed by the GPC technique and the result thus obtained was shown in FIG. 6 as a GPC chart.

EXAMPLE 1

There was uniformly dissolved 500 parts by weight of the bisphenol A-cleavage residue (having an OH value of 247 mg KOH/g, an average molecular weight of 460 as determined by the GPC technique, and a softening point of 98° C. as determined by the ring and ball method) in 500 parts by weight of the high-boiling fraction obtained through the preparation of bisphenol F (having a binuclear moiety content of 4.9% by weight, a trinuclear moiety content of 69.1% by weight, a tetranuclear moiety content of 18.6% by weight and a content of other components of 7.4% by weight). Then the resulting uniform mixture was introduced into a reactor equipped with a stirring machine, a reflux condenser and a thermometer, subsequently 31.7 parts by weight of a 37% formalin aqueous solution and 10 parts by weight of oxalic acid were added to the mixture and the resulting mixture was heated with stirring. Reflux of the mixture was initiated at about 98° C. and the reaction was run at a temperature ranging from 95° to 100° C. over 120 minutes after the initiation of the reflux. After completion of the reaction, the reaction system was dehydrated to give a resin. Salicylic acid as a curing accelerator was added to the reaction system immediately before the removal of the resin from the reactor in an amount of one part by weight per 100 parts by weight of the resin and then uniformly admixed to give a resin composition.

EXAMPLE 2

To the condensate of the high-boiling fraction prepared in Resin-Preparation Example 1, there was added the bisphenol A-purification residue (comprising 32.6% by weight of bisphenol A, 0.6% by weight of o,p'-dihydroxydiphenylpropane, 2.3% by weight of Chroman I, 8.5% by weight of a derivative of Chroman I, 3.5% by weight of trisphenol and 56.7% by weight of other by-products) immediately before the removal of the condensate from the reactor in an amount of 200 parts by weight per 800 parts by weight of the condensate and then benzoic acid as a curing accelerator was added to the mixture in an amount of 0.5 part by weight per 100 parts by weight of the resin to give a resin composition uniformly admixed.

EXAMPLE 3

To the condensate of the high-boiling fraction prepared in Resin-Preparation Example 2, there was added the bisphenol A-cleavage residue (having an OH value of 247 mg KOH/g, an average molecular weight of 460 as determined by the GPC technique, and a softening point of 98° C. as determined by the ring and ball method) immediately before the removal of the condensate from the reactor in an amount of 400 parts by weight per 600 parts by weight of the condensate and then benzoic acid as a curing accelerator was added to the mixture in an amount of 0.5 part by weight per 100 parts by weight of the resin to give a resin composition uniformly admixed.

EXAMPLE 4

The same procedures used in Example 1 were repeated except that the bisphenol A-purification residue (comprising 32.6% by weight of bisphenol A, 0.6% by weight of o,p'-dihydroxydiphenyl-propane, 2.3% by weight of Chroman I, 8.5% by weight of a derivative of Chroman I, 3.5% by weight of trisphenol and 56.7% by weight of other by-products) was substituted for the bisphenol A-cleavage residue to give a uniform resin composition.

EXAMPLE 5

To the condensate of the high-boiling fraction prepared in Resin-Preparation Example 3, there was added the condensate of the bisphenol A-cleavage residue prepared in Resin-Preparation Example 5 immediately before the removal of the condensate of the high-boiling fraction from the reactor in an amount of 500 parts by weight per 500 parts by weight of the condensate of the high-boiling fraction and then benzoic acid as a curing accelerator was added to the mixture in an amount of 0.5 part by weight per 100 parts by weight of the resin to give a resin composition uniformly admixed.

EXAMPLE 6

To the condensate of the high-boiling fraction prepared in Resin-Preparation Example 3, there was added the condensate of the bisphenol A-purification residue prepared in Resin-Preparation Example 4 immediately before the removal of the condensate of the high-boiling fraction from the reactor in an amount of 500 parts by weight per 500 parts by weight of the condensate of the high-boiling fraction and then benzoic acid as a curing accelerator was added to the mixture in an amount of 0.5 part by weight per 100 parts by weight of the resin to give a resin composition uniformly admixed.

Comparative Example 1

There was uniformly dissolved 500 parts by weight of the bisphenol A-purification residue used in Example 2 (comprising 32.6% by weight of bisphenol A, 0.6% by weight of o,p'-dihydroxydiphenylpropane, 2.3% by weight of Chroman I, 8.5% by weight of a derivative of Chroman I, 3.5% by weight of trisphenol and 56.7% by weight of other by-products) in 500 parts by weight of phenol. Then the resulting uniform mixture was introduced into a reactor equipped with a stirring machine, a reflux condenser and a thermometer, subsequently 300 parts by weight of a 37% formalin aqueous solution and 10 parts by weight of oxalic acid were added to the mixture and the resulting mixture was heated with stirring. Reflux of the mixture was initiated at about 98° C. and the reaction was run at a temperature ranging from 95° to 100° C. over 120 minutes after the initiation of the reflux. After completion of the reaction, the reaction system was dehydrated to give a phenolic resin. Benzoic acid as a curing accelerator was added to the reaction system immediately before the removal of the resin from the reactor in an amount of 1.0 part by weight per 100 parts by weight of the resin and then uniformly admixed to give a resin composition.

Comparative Example 2

Salicylic acid as a curing accelerator was added to the condensate of the high-boiling fraction prepared in Resin-Preparation Example 2 immediately before the removal of the condensate from the reactor in an amount of 1.0 part by weight per 100 parts by weight of the resin to give a resin composition uniformly admixed.

Comparative Example 3

To the phenol novolak resin prepared in Resin-Preparation Example 6, there were added the condensate of the bisphenol A-cleavage residue prepared in Resin-Preparation Example 5 in an amount of 400 parts by weight per 600 parts by weight of the phenol novolak resin and benzoic acid as a curing accelerator in an amount of 0.5 part by weight per 100 parts by weight of the resin to give a resin composition uniformly admixed.

Comparative Example 4

To the phenol novolak resin whose contents of mono- and bi-nuclear moieties had been reduced through distillation under reduced pressure and which was prepared in Resin-Preparation Example 7, there were added the condensate of the bisphenol A-cleavage residue prepared in Resin-Preparation Example 5 in an amount of 400 parts by weight per 600 parts by weight of the phenol novolak resin and benzoic acid as a curing accelerator in an amount of 0.5 part by weight per 100 parts by weight of the resin to give a resin composition uniformly admixed.

2. Preparation of Coated Sand Particles

There was immediately introduced, into a small-sized mixer for laboratory use, in the order: 4000 parts by weight of quartz sand preheated to 190° C., 110 parts by weight of each of the resin compositions prepared in the foregoing Examples and Comparative Examples after it was roughly pulverized and 70 parts by weight of a 15% aqueous solution of hexamethylene-tetramine and then the mixture was sufficiently stirred. About 5 minutes after the preparation of the mixture, the flow properties of the sand particles got better. At this stage, 4 parts by weight of calcium stearate was further added, followed by mixing for 30 seconds and removal of the resulting coated sand particles. Thus, coated sand particles for each resin composition were prepared.

The rate of disintegration (R.Dis.) and the cold shell flexural strength (C.S.F.S.) of each coated sand product were determined according to the methods discussed above. The results thus obtained are summarized in the following Table 1. Moreover, the intensity of the smell produced during firing (I.S.) and the smoke density of each coated sand product were also determined and likewise listed in the following Table 1.

TABLE 1

| Ex. No. | C.S.F.S. (kgf/cm$^2$) | R. Dis. (%) | Smoke Density (mg/m$^3$) | I.S. (Times) | Evaluation of Smoke Density and I.S. |
| --- | --- | --- | --- | --- | --- |
| 1 | 52.2 | 35.1 | 0.45 | 320 | Δ–O |
| 2 | 54.8 | 30.3 | 0.34 | 260 | O |
| 3 | 53.4 | 30.7 | 0.33 | 250 | O |
| 4 | 52.5 | 35.3 | 0.44 | 310 | Δ–O |
| 5 | 54.5 | 30.3 | 0.31 | 250 | O |
| 6 | 53.5 | 31.2 | 0.36 | 290 | O |
| 1* | 51.3 | 33.0 | 0.95 | 1200 | x |
| 2* | 47.5 | 19.5 | 0.31 | 230 | O |
| 3* | 46.2 | 28.5 | 0.96 | 1300 | x |
| 4* | 43.2 | 27.5 | 0.40 | 270 | O |

1*, 2*, 3* and 4* are Comparative Examples.
O: The intensity of the smell and the smoke density were substantially smaller or lower than those observed for the conventional resin composition.
Δ: The intensity of the smell and the smoke density were smaller or lower than those observed for the conventional resin composition.
x: The intensity of the smell and the smoke density were substantially strong or high.

The use of the combination of the bisphenol A-purification residue and the high-boiling fraction obtained through the preparation of bisphenol F permitted the reduction of the intensity of smell produced during formation of a mold and the decrease in the smoke density while holding a desired level of the cold shell flexural strength and an appropriate rate of disintegration as will be apparent from the comparison with Comparative Example 1 in which only bisphenol A-purification residue was used.

On the other hand, when only the condensate of the high-boiling fraction obtained through the preparation of bisphenol F was used (see Comparative Example 2), the resulting mold had poor disintegration properties and requires a sand-burning process.

Moreover, the combination of the conventional phenol novolak resin with the condensate of the bisphenol A-cleavage residue (Comparative Example 3) did not possess the shell flexural strength and appropriate rate of disintegration of the resulting mold, and did not reduce the intensity of smell and the smoke density.

Further the combination of the conventional phenol novolak resin whose mono- and bi-nuclear moiety contents were reduced through distillation with the condensate of the bisphenol A-cleavage residue (Comparative Example 4) did not provide the desired strength of the resulting mold.

The foregoing characteristic properties of the resin composition of the present invention can be ascribed to the characteristic distribution of the number of condensed nuclei observed on the high-boiling fraction obtained through the preparation of bisphenol F and the condensate of the high-boiling fraction.

The object of the present invention can be accomplished only when using the high-boiling fraction obtained through the preparation of bisphenol F characterized by having a high trinuclear moiety content or the condensate of the high-boiling fraction obtained through the preparation of bisphenol F in combination with the bisphenol A-purification residue or the cleavage residue produced from the bisphenol A-purification residue as will be apparent from the comparison of FIGS. 1 to 4 with FIG. 5.

Moreover, the resin composition of the present invention which comprises the high-boiling fraction obtained through the preparation of bisphenol F and the condensate of the high-boiling fraction was practically used to, on the spot, produce an article, i.e., a core for aluminum castings which had conventionally been proved to have poor disintegration properties after casting and had required the use of a sand-baking treatment. The resulting article was tested for various properties. As a result, it was found that the article possessed excellent disintegration properties after casting and that the coated sand particles could be smoothly eliminated without any sand-baking treatment.

We claim:

1. A phenolic resin composition comprising an acid catalyzed reaction product wherein formaldehyde, at least one phenol compound A, and at least one phenolic compound B are condensed in an acid catalyzed reaction, said at least one phenol compound A selected from the group consisting of:
(a) a bisphenol A-purification residue formed by reacting phenol with acetone in the presence of hydrochloric acid at a temperature of from 45° to 65° C., heating the resulting mixture up to a temperature of from 120° to 130° C. at a reduced pressure of from 75 to 70 mm Hg to remove hydrochloric acid, heating the resulting mixture up to 185° C. at a reduced pressure of 40 mm Hg to remove unreacted phenol and heating the resulting mixture up to a temperature of from 195° to 260° C. at a reduced pressure of from 7 to 3 mm Hg to remove bisphenol A and isomers, mad (b) a bisphenol A-cleavage residue formed by treating the bisphenol A-purification residue of step (i)(a) in the presence of a basic or acidic catalyst at a temperature of from 180° to 250° C.; and said at least one phenolic compound B consisting of:
(c) a trinuclear bisphenol F fraction comprising at least three condensed phenol nuclei formed by reacting a phenol with formaldehyde at a molar ratio (P/F) ranging from 6 to 40 in the presence of an acidic catalyst at a temperature of from 50° to 100° C., heating the resulting mixture to remove acidic catalyst, generated water and unreacted phenol and distilling the resulting crude bisphenol F at a temperature of from 200° to 250° C. under reduced pressure.

2. The phenolic resin composition according to claim 1 wherein the phenol compound A is a bisphenol A-cleavage residue formed by reacting phenol with acetone in the presence of hydrochloric acid at a temperature of from 45° to 65° C., heating the resulting mixture up to a temperature of from 120° to 130° C. at a reduced pressure of from 75 to 70 mm Hg to remove hydrochloric acid, heating the resulting mixture up to 185° C. at a reduced pressure of 40 mm Hg to remove unreacted phenol and heating the resulting mixture up to a temperature of from 195° to 260° C. at a reduced pressure of from 7 to 3 mm Hg to remove bisphenol A and isomers to obtain a bisphenol A-purification residue and treating the bisphenol A-purification residue in the presence of a caustic soda aqueous solution at a temperature of 200° C., and the phenolic compound B is a trinuclear bisphenol F fraction formed by reacting a phenol with formaldehyde at a molar ratio (P/F) ranging from 6 to 40 in the presence of an acidic catalyst at a temperature of from 50° to 110° C., heating the resulting mixture to remove acidic catalyst, generated water and unreacted phenol, distilling the resulting crude bisphenol F at a temperature of from 200° to 250° C. under reduced pressure to obtain a trinuclear bisphenol F fraction comprising at least three condensed phenol nuclei.

3. The phenolic resin composition according to claim 1 wherein the phenolic compound B is a trinuclear bisphenol F fraction comprising at least three condensed phenol nuclei formed by reacting a phenol with formaldehyde at a molar ratio (P/F) ranging from 6 to 40 in the presence of an acidic catalyst at a temperature of from 50° to 110° C., heating the resulting mixture to remove acidic catalyst, generated water and unreacted phenol and distilling the resulting crude bisphenol F at a temperature of from 200° to 250° C. under reduced pressure such that the content of trinuclear phenolic resin as a principal component thereof ranges from 60 to 95% by weight.

4. A composition for producing an acid catalyzed phenolic resin comprising a mixture of:
(i) at least one phenol compound A selected from the group consisting of:
(a) a bisphenol A-purification residue formed by reacting phenol with acetone in the presence of hydrochloric acid at a temperature of from 45° to 65° C., heating the resulting mixture up to a temperature of from 120° to 130° C. at a reduced pressure of from 75 to 70 mm Hg to remove hydrochloric acid, heating the resulting mixture up to 185° C. at a reduce pressure of 40 mm Hg to remove unreacted phenol and heating the resulting mixture up to a temperature of from 195° to 260° C. at a reduced pressure of from 7 to 3 mm Hg to remove bisphenol A and isomers, and
(b) a bisphenol A-cleavage residue formed by treating the bisphenol A-purification residue of step (i)(a) in the presence of a basic or acidic catalyst at a temperature of from 180° to 250° C.; and (ii) at least one phenolic compound B consisting of:
(c) a trinuclear bisphenol F fraction comprising at least three condensed phenol nuclei formed by reacting a phenol with formaldehyde at a molar ratio (P/F) ranging from 6 to 40 in the presence of an acidic catalyst at a temperature of from 50° to 100° C., heating the resulting mixture to remove acidic catalyst, generated water and unreacted phenol and distilling the resulting crude bisphenol F at a temperature of from 200° to 250° C. under reduced pressure.

5. A composition according to claim 4 wherein the phenol compound A is a bisphenol A-cleavage residue formed by reacting phenol with acetone in the presence of hydrochloric acid at a temperature of from 45° to 65° C., heating the resulting mixture up to a temperature of from 120° to 130° C. at a reduced pressure of from 75 to 70 mm Hg to remove hydrochloric acid, heating the resulting mixture up to 185° C. at a reduced pressure of 40 mm Hg to remove unreacted phenol and heating the resulting mixture up to a temperature of from 195° to 260° C. at a reduced pressure of from 7 to 3 mm Hg to remove bisphenol A and isomers to obtain a bisphenol A-purification residue and treating the bisphenol A-purification residue in the presence of a caustic soda aqueous solution at a temperature of 200° C., and the phenolic compound B is a trinuclear bisphenol F fraction formed by reacting a phenol with formaldehyde at a molar ratio (P/F) ranging from 6 to 40 in the presence of an acidic catalyst at a temperature of from 50° to 110° C., heating the resulting mixture to remove acidic catalyst, generated water and unreacted phenol, distilling the resulting crude bisphenol F at a temperature of from 200° to 250° C. under reduced pressure to obtain a trinuclear bisphenol F fraction comprising at least three condensed phenol nuclei.

6. The phenolic resin composition according to claim 4 wherein the phenolic compound B is a trinuclear bisphenol F fraction comprising at least three condensed phenol nuclei formed by reacting a phenol with formaldehyde at a molar ratio (P/F) ranging from 6 to 40 in the presence of an acidic catalyst at a temperature of from 50° to 110° C., heating the resulting mixture to remove acidic catalyst, generated water and unreacted phenol and distilling the resulting crude bisphenol F at a temperature of from 200° to 250° C. under reduced pressure such that the content of trinuclear phenolic resin as a principal component thereof ranges from 60 to 95% by weight.

* * * * *